(12) United States Patent
Huiberts

(10) Patent No.: US 8,375,845 B2
(45) Date of Patent: Feb. 19, 2013

(54) DEVICE FOR PREPARING HOT WATER AND COFFEE MACHINE PROVIDED WITH SUCH A DEVICE

(75) Inventor: Johannes Theodorus Emerentia Huiberts, Spanbroek (NL)

(73) Assignee: Bravilor Holding B.V., Heerhugowaard (NL)

( * ) Notice: Subject to any disclaimer, the term of this patent is extended or adjusted under 35 U.S.C. 154(b) by 867 days.

(21) Appl. No.: 12/090,948

(22) PCT Filed: Oct. 17, 2006

(86) PCT No.: PCT/NL2006/050261
§ 371 (c)(1),
(2), (4) Date: Apr. 21, 2008

(87) PCT Pub. No.: WO2007/046702
PCT Pub. Date: Apr. 26, 2007

(65) Prior Publication Data
US 2008/0245238 A1    Oct. 9, 2008

(30) Foreign Application Priority Data
Oct. 20, 2005   (NL) .................................. 1030235

(51) Int. Cl.
*A47J 31/40*   (2006.01)
(52) U.S. Cl. .......................................... 99/280
(58) Field of Classification Search ............ 99/292, 99/293, 302 R, 307, 280–283
See application file for complete search history.

(56) References Cited

U.S. PATENT DOCUMENTS

| 2,283,967 | A | * | 5/1942 | Brown | ...................... 99/289 R |
| 3,353,474 | A | | 11/1967 | MacCorkell | |
| 3,824,914 | A | | 7/1974 | Casiano | |
| 4,137,833 | A | | 2/1979 | Yelloz | |
| 4,583,449 | A | * | 4/1986 | Dangel et al. | ................ 99/279 |
| 5,498,757 | A | | 3/1996 | Johnson et al. | |
| 7,770,511 | B2 | * | 8/2010 | Yao | ................................ 99/293 |

FOREIGN PATENT DOCUMENTS

| FR | 1302229 A | | 8/1962 |
| GB | 2139481 A | | 11/1984 |
| WO | WO 2004/060382 | * | 7/2004 |

OTHER PUBLICATIONS

International Search Report for International Application No. PCT/NL2006/050261.
International Preliminary Report on Patentability for International Application No. PCT/NL2006/050261.

* cited by examiner

*Primary Examiner* — Duc Nguyen
*Assistant Examiner* — Mark Woodall
(74) *Attorney, Agent, or Firm* — Young & Thompson

(57) ABSTRACT

The invention relates to a device for preparing hot water provided with a pressure pump with a supply pipe for supplying relatively cold water to the pressure pump and an outlet connected to a heating pipe which is in heat-exchanging contact with a heating body, with an outlet valve in the heating pipe and a coffee holder, connected to the heating pipe, for accommodating a bed of coffee, whereby the heating body comprises a reservoir that is openly connected to the environment, with a heating element and water in the reservoir as a heat-exchange medium. A by-pass pipe (54) connects the inlet (57) and outlet (35) of the pressure pump (34) to each other, with a pressure-operated valve (56) in the by-pass pipe.

12 Claims, 3 Drawing Sheets

DEVICE FOR PREPARING HOT WATER AND COFFEE MACHINE PROVIDED WITH SUCH A DEVICE

BACKGROUND OF THE INVENTION

1. Field Of The Invention

Figure 1:
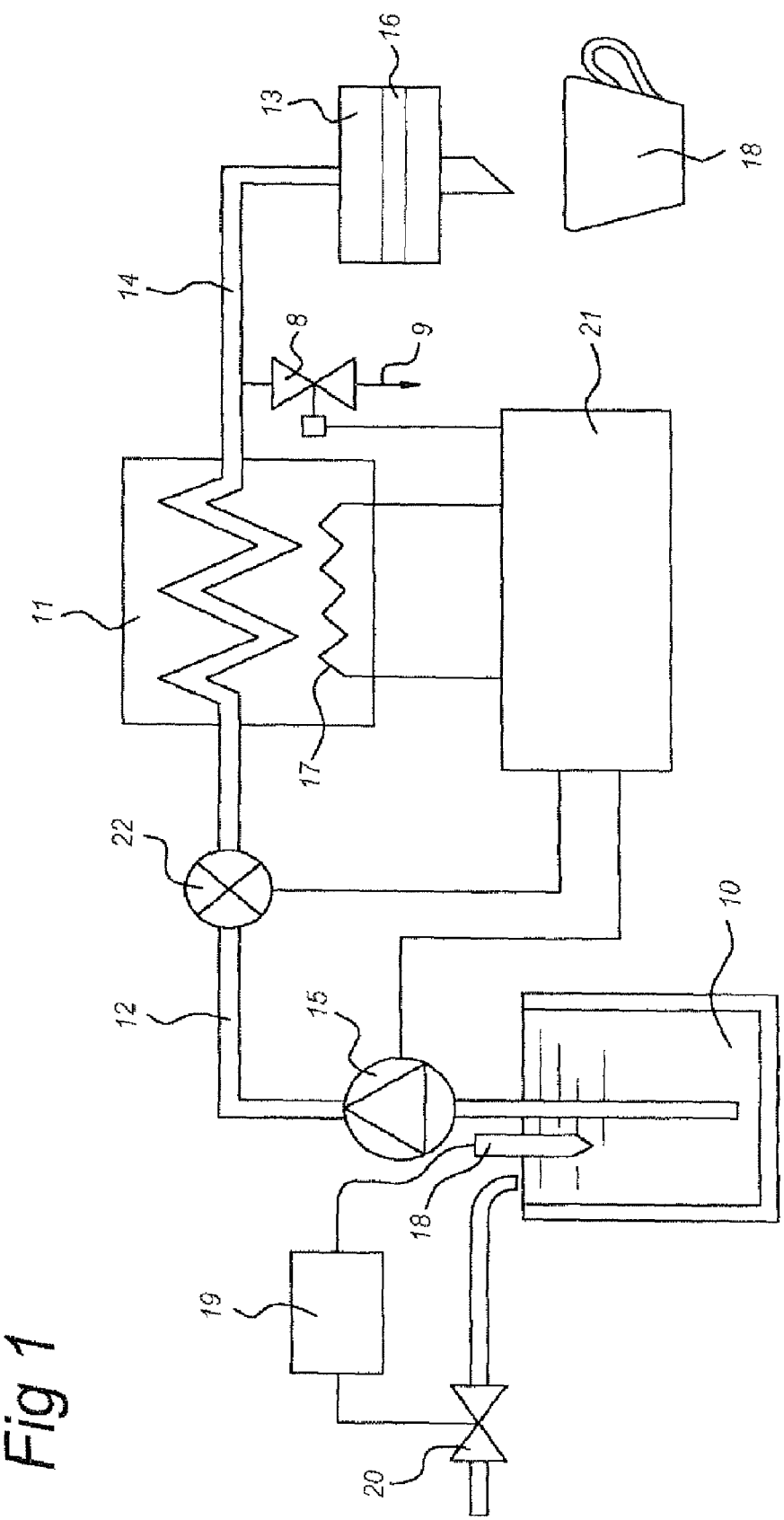

The invention relates to a device for preparing hot water provided with a pressure pump with a supply pipe for supplying relatively cold water to the pressure pump and an outlet connected to a heating pipe, which is in heat-exchanging contact with a heating body, with an outlet valve in the heating pipe and a coffee holder, connected to the heating pipe, for accommodating a bed of coffee, whereby the heating body comprises a reservoir that is openly connected to the environment, with a heating element and water in the reservoir as a heat-exchange medium.

2. Description Of The Related Art

Such a device is known, for example, in an espresso machine that is described in U.S. Pat. No. 5,498,757. In such a unit, coffee extract is obtained by forcing non-boiling water at a temperature of approximately 85° C. to 105° C. through a bed of ground coffee at a pressure of approximately 10 bars as a result of which the required flavours and aromatic substances end up in the water. In this way between 25 ml and 130 ml of coffee extract are produced with approximately 15 g of ground coffee.

When preparing coffee, a specially designed appliance is used that more or less carries out the coffee-making procedure automatically. In most of these appliances cold water is pressurised with a pump in order to then be passed through a heating element where it is heated to the required temperature. The required pressure is achieved by pressing the bed of ground coffee into a more or less compact mass which restricts the water from flowing through it, thereby achieving a build up of pressure.

In order to reduce the pressure after the coffee-making process the flow of water is taken to an open outlet after which the remaining water is generally directed to a drain.

Draining the water still remaining in the system also prevents this remaining water boiling as a result of overheating and producing steam, or the expansion of the still present cold water, which in both cases could lead to unacceptable increase in pressure as a result of which damage to the system could occur. The disadvantage of draining the hot water is, however, that the known system is not efficient in terms of hot water use. Furthermore, a special drain has to be applied which connects either to a central water drain, or has to collect the water in a reservoir which must then be regularly emptied.

As the known heating pipe is in heat-exchanging contact with the water in the reservoir that is open to the atmosphere, for example by the heating pipe passing through the reservoir, the temperature of the water in the heating pipe can never be higher than the boiling point of water. In this way undesirable steam formation and pressure build up in the heating pipe are prevented.

When making coffee the pressure pump should force pressurised water through the heating pipeline to the bed of coffee. By correctly dimensioning the heating pipeline the correct temperature is reached. On closing the dispensing valve the pressure in the pipe section downstream of the dispensing valve is equivalent to the atmospheric pressure.

SUMMARY OF THE INVENTION

A drawback of the known device is that the pump is connected via an excess pressure valve to the heat exchanger. When the pressure in the pipe upstream of the heat exchanger increases, this excess pressure valve releases water to the surroundings. Separate devices are required for collecting this water, which makes the known device relatively complex. Furthermore, in the event of excess pressure a loss of water takes place, as a result of which unnecessary energy losses occur.

It is therefore an objective of the invention to provide a device for preparing hot water which is of low complexity. A further objective of the invention is to provide a device for preparing hot water in which an excess pressure safety device is incorporated that limits energy loss. Another objective is to provide a device that is relatively compact.

To this end, a device in accordance with the invention is characterised in that a by-pass line connects the inlet and outlet of the pressure pump with a pressure-operated valve in the by-pass line.

By applying a by-pass line parallel to the pressure pump, in the case of strongly increasing pressure the water can be supplied to the suction side of the pump, the suction side of which is connected to the atmosphere via the reservoir. In this way, in the event of excess pressure it is not necessary to externally remove water from the device, so that no additional provisions for water collection or drainage are necessary. As a result of this the device can be designed relatively simply. In addition, in the event of excess pressure the hot water will flow to the low-pressure side of the pump and in the following delivery cycle will be returned by the pump to the heat exchanger, preserving the contained heat. In this way the device in accordance with the invention can be designed to be relatively energy-saving. As the heating pipe has no additional excess pressure valve between the pump and the heat exchanger this pipe can be designed to be relatively short and the pump can be placed relatively close to the heating pipe, so that a compact device is obtained.

In one example of embodiment of a device in accordance with the invention, the reservoir is connected to a water supply pipe and to a hot water delivery pipe for supplying hot water from the reservoir. The hot water in the reservoir can in addition to heat exchange be used for hot water preparation with which hot water and drinks other than coffee can be prepared, such as tea, chocolate, packet soups and suchlike.

A second pump can be connected to the water supply pipe, which is designed to supply water to the reservoir, while the pressure pump does not operate if no coffee is being made. The second pump can be incorporated in the supply pipe of the pressure pump, whereby this supply pipe is connected to the reservoir via a branch pipe. In an alternative form of embodiment the second pump is connected with a parallel supply pipe that opens directly into the hot water reservoir.

Preferably the supply pipe of the pressure pump has a flow meter built into it which is connected to a regulating unit for controlling the at least one pump on the basis of the volume flowing through the flow meter per unit of time. With the flow meter the quantity of water supplied to the reservoir can be accurately determined, whereby the second pump is controlled by the regulating unit on the basis of an input signal originating from the flow meter.

Alternatively the second pump is connected via the parallel supply pipe to the reservoir and the quantity of water supplied to the reservoir is determined by the operating time and speed of the second pump.

The regulating unit is preferably connected to a user-operated selection unit for selecting the delivery valve or the valve in the hot water delivery pipe.

BRIEF DESCRIPTION OF THE DRAWING FIGURES

Figure 2:
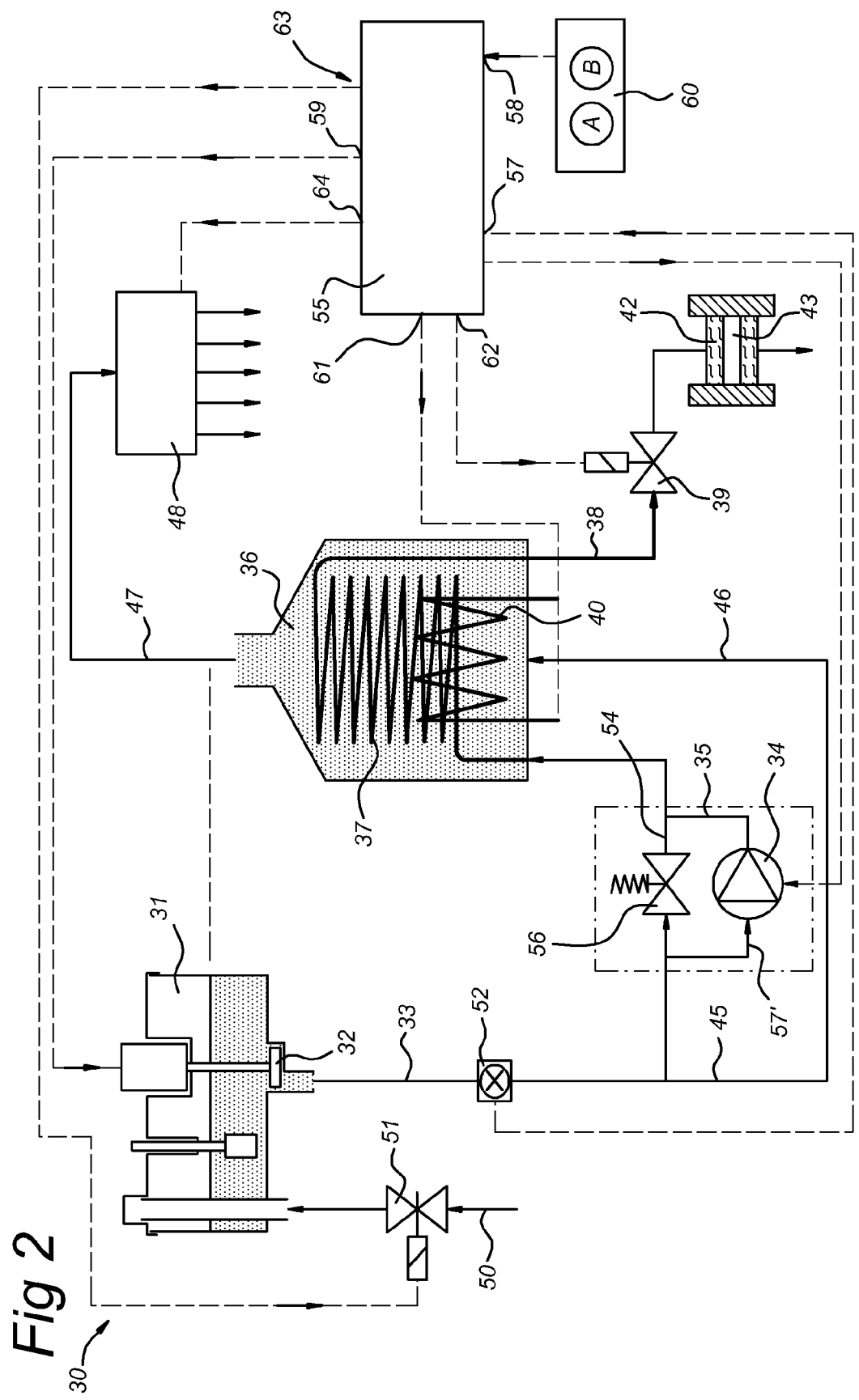
Figure 3:
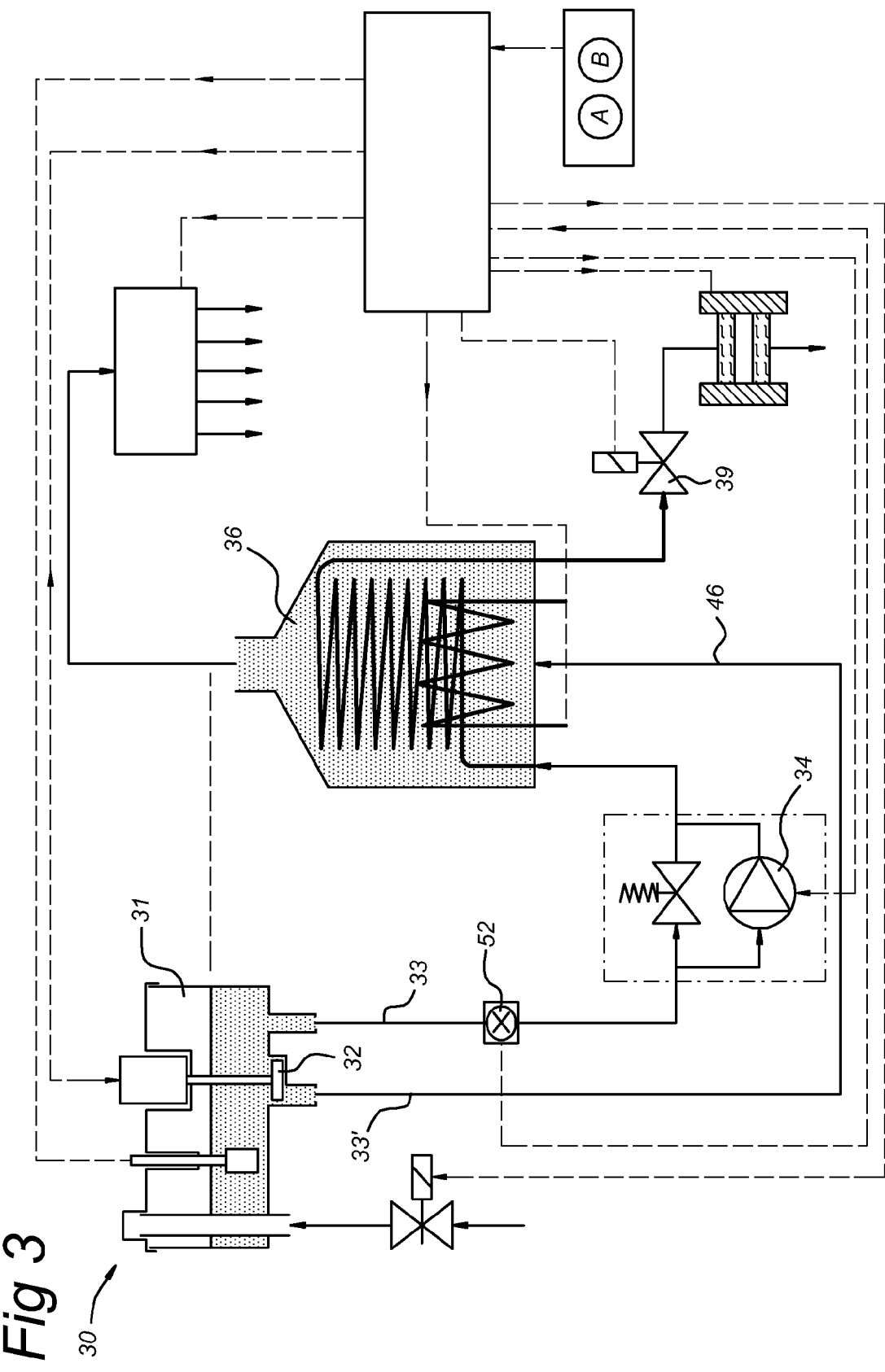

One form of embodiment of the invention will be described in more detail using the attached drawings. In the drawings FIG. 1 schematically shows a device in accordance with the prior art;

FIG. 2 shows a schematic overview of a first form of embodiment of a device in accordance with the invention; and FIG. 3 shows a schematic overview of a form of embodiment in which an additional supply pipe is provided between the cold water reservoir and the warm water reservoir.

DETAILED DESCRIPTION OF THE INVENTION

FIG. 1 shows a coffee-making machine in accordance with the prior art with a cold water reservoir 10 to which cold water, from a water mains supply for example, is added via a tap 20. A level sensor 18 in the reservoir 10 is connected to a regulator 19 that operates the tap 20. Via a pump 15, water is taken from the reservoir to heating unit 11 which is generally filled with water that is kept, for example, at a temperature of 100° C. by means of heating element 17. The heating element is controlled by a regulator 21 which also operates the pump 15 on the basis of measuring values originating from flow meter 22. Via the heating pipe 14, hot water can flow to the holder 13 in which a bed of coffee 16 is present in pressed form. In the event of a build up of pressure of approx. 10 bars the coffee extract can flow to a cup 18. Such a device is described in NL 1023023 in the name of the applicant.

Via a valve 8, which is operated by the regulator 21, after making coffee the water is removed from the pipe 14 to an outlet pipe 9, and from there to a collection reservoir or to a drain.

FIG. 2 shows a device 30 in accordance with the invention, with a cold water reservoir 31 which via a pump 32 is connected to supply pipe 33. The supply pipe 33 opens into a pressure pump 34 which at its outlet side 35 is connected to a warm water reservoir 36. The heating Pipe extends along a meandering path in the warm water reservoir 36, for example in the form of a coil 37, and is connected via a pipe 38 to an outlet valve 39. Via the outlet valve 39, pressurised water can be supplied to a coffee holder 42 containing an enclosed and compressed bed 43 of ground coffee.

Via a branch pipe 45 the pump 32 is connected to the water supply pipe 46 of the warm water reservoir 36. The reservoir 36 comprises a heating element 40 and is openly connected to the atmosphere. The warm water can, via a hot water delivery pipe 47, be supplied from the reservoir 36 to a delivery head 48 for delivering hot water to a user.

The cold water reservoir 31 is connected to a supply pipe 50 which via a valve 51 supplies water to the reservoir 31. A flow meter 52, which is connected to a control unit 55, is placed in the pipe 33.

A pressure-regulated valve 56 connects the outlet side 35 of the pressure pump 34 with the inlet side 57'.

A regulating unit 55 is also provided which with an outlet 59 is connected (in the figure the electrical contacts are schematically shown by a broken line) with the second pump 32 and with the pressure pump 34 for switching these pumps on and off. A regulating unit 55 with an output 61 is connected to a heating element 40, with an output 64 with the delivery head 48. At an input 57 the regulating unit 55 also receives a flow measurement originating from the flow meter 52 and at an input 58 an input value originating from a selection unit 60.

When making coffee, the user, via the selection unit 60 forwards the selection to the regulating unit 55 so that this sets the device 30 into the correct operating condition. Through the regulating unit 55 (when coffee making is selected by the user) the pressure pump 34 is switched on and the delivery valve 39 is opened. The heating element 40, which is connected to a temperature sensor in the reservoir 36, is then operated so that the water in the reservoir 36 is kept at a constant temperature. Cold water that is pumped by pressure pump 34 though the coil 37 is heated to a temperature of approximately 97° C. Via the opened valve 39 the hot water is forced through the bed of coffee at a pressure of approximately 10 bars.

After delivering a predetermined quantity of water, which is specified precisely in the regulating unit 55 on the basis of the values originating from the flow meter, the delivery valve 39 is closed so that the pressure in the bed of coffee 43 and in the pipe between the holder 42 and the delivery valve 39 can return to atmospheric pressure.

In order to restrict the pressure in the pipes 35, 38 and to prevent an increase in pressure, for example as a result of expansion of the cold water being heated up in these pipes, the outlet side 35 of the pressure pump 34 is connected to the inlet side 57' of the pressure pump 34 by way of a short circuit line 54 and a spring-loaded valve 56.

When delivering hot water via the delivery head 48 the selection of this by the user is forwarded to the regulating unit 55 is forwarded via the selection unit 60, for example by pressing or turning a button. The regulating unit 55 then, with valve 39 closed, switches on the second pump 32 and cold water is pumped from the pipe 46 to the reservoir 36, and warm water, preferably at a temperature of between 85° C. and 97° C. is transported from the reservoir 36 via the pipe 47 to the delivery head 48.

In the form of embodiment in accordance with FIG. 3 a parallel supply pipe 33' is incorporated between the cold water reservoir 31 and the warm water reservoir 36. This is advantageous in those cases when the pump can either supply insufficient flow to the pressure pump 34 or causes too much turbulence in the flow meter 52 so that operation of the latter is impaired. By way of the parallel pipe 33' the water is supplied to the warm water reservoir 36, while only the quantity of the water supplied to the pressure pump 34 is measured by the flow meter. The quantity of water delivered to the warm water reservoir 36 is determined by the known pump performance of pump 32, multiplied by the duration of time that pump 32 is in operation.

The invention claimed is:

1. A device for preparing hot water, comprising:

a pressure pump;

a pressure pump water supply pipe for supplying relatively cold water to the pressure pump;

an outlet connected to a heating pipe which is in heat-exchanging contact with a heating body;

an outlet valve in the heating pipe; and a coffee holder, connected to the heating pipe, for accommodating a bed of coffee, wherein the heating body comprises a heating reservoir that is in open communication with the surroundings, with a heating element and water in the heating reservoir as a heat-exchange medium, a cold water reservoir which is in open communication with the surroundings being connected to the inlet of the pressure pump, a by-pass pipe connects the inlet and outlet of the pressure pump to each other, with a pressure-operated valve in the by-pass pipe, a flow meter being incorporated in a duct between the cold water reservoir and the pressure pump, a signal output of the flow meter being connected to a regulating device for operation of the pressure pump, wherein the inlet of the pressure pump is in open fluid communication with the cold water reservoir via the flow meter, and wherein the heating reservoir is at an inlet side connected with a water supply pipe that is connected with a second pump and is at an outside side connected with a hot water delivery pipe for delivering hot water from the reservoir, the outlet comprising an electrically-operated outlet valve, an electrically operated delivery device being incorporated into the hot water delivery pipe, the regulating device being connected with the electrically-operated outlet valve, with the delivery device and with the second pump for operation thereof, and whereby the regulating device is connected with a user-operated selection unit for selecting the operation of the outlet valve or the delivery device in the hot water delivery pipe, and the regulating device is adapted to, when operation of the delivery device is selected by a user, close the valve and operate the second pump so that cold water is pumped to the heating reservoir via the water supply pipe and warm water is transported from the heating reservoir via the hot water delivery pipe.

2. The device in accordance with claim 1, wherein a second pump is connected with the heating reservoir water supply pipe.

3. The device in accordance with claim 2, wherein the second pump is incorporated in the pressure pump water supply pipe of the pressure pump, and the heating reservoir water supply pipe is connected to the reservoir via a branch pipe.

4. The device in accordance with claim 2, wherein a parallel supply pipe is connected on one hand with the second pump and on the other hand with the heating reservoir.

5. The device in accordance with claim 2, wherein incorporated in the pressure pump water supply pipe is the flow meter which is connected with the regulating device, the second pump is connected with the heating reservoir water supply pipe, and the regulating device operates on a basis of flow measured by the flow meter.

6. The device in accordance with claim 1, wherein incorporated in the pressure pump water supply pipe is the flow meter which is connected with the regulating device, the second pump is connected with the heating reservoir water supply pipe, and the regulating device operates on a basis of flow measured by the flow meter.

7. A coffee-making machine, comprising:
a pressure pump;
a pressure pump water supply pipe for supplying relatively cold water to the pressure pump;
an outlet connected to a heating pipe which is in heat-exchanging contact with a heating body;
an outlet valve in the heating pipe; and
a coffee holder, connected to the heating pipe, for accommodating a bed of coffee, wherein
the heating body comprises a heating reservoir that is in open communication with the surroundings, with a heating element and water in the heating reservoir as a heat-exchange medium,
a cold water reservoir which is in open communication with the surroundings being connected to the inlet of the pressure pump, a by-pass pipe connects the inlet and outlet of the pressure pump to each other, with a pressure-operated valve in the by-pass pipe,
a flow meter being incorporated in a duct between the cold water reservoir and the pressure pump, a signal output of the flow meter being connected to a regulating device for operation of the pressure pump, wherein the inlet of the pressure pump is in open fluid communication with the cold water reservoir via the flow meter, and wherein the heating reservoir is at an inlet side connected with a water supply pipe that is connected with a second pump and is at an outside side connected with a hot water delivery pipe for delivering hot water from the reservoir, the outlet comprising an electrically-operated outlet valve, an electrically operated delivery device being incorporated into the hot water delivery pipe, the regulating device being connected with the electrically-operated outlet valve, with the delivery device and with the second pump for operation thereof, and whereby the regulating device is connected with a user-operated selection unit for selecting the operation of the outlet valve or the delivery device in the hot water delivery pipe, and the regulating device is adapted to, when operation of the delivery device is selected by a user, close the valve and operate the second pump so that cold water is pumped to the heating reservoir via the water supply pipe and warm water is transported from the heating reservoir via the hot water delivery pipe.

8. A coffee-making machine that can either make coffee or dispense hot water, comprising:
a pressure pump;
a pressure pump water supply pipe for supplying relatively cold water to the pressure pump;
an outlet connected to a heating pipe which is in heat-exchanging contact with a heating body;
an outlet valve in the heating pipe; and
a coffee holder, connected to the heating pipe for accommodating a bed of coffee, wherein
the heating body comprises a heating reservoir that is in open communication with the surroundings, with a heating element and water in the heating reservoir as a heat-exchange medium,
a cold water reservoir which is in open communication with the surroundings being connected to the inlet of the pressure pump, a by-pass pipe connects the inlet and outlet of the pressure pump to each other, with a pressure-operated valve in the by-pass pipe,
a flow meter being incorporated in a duct between the cold water reservoir and the pressure pump, a signal output of the flow meter being connected to a regulating device for operation of the pressure pump, wherein the inlet of the pressure pump is in open fluid communication with the cold water reservoir via the flow meter, and wherein the heating reservoir is at an inlet side connected with a water supply pipe that is connected with a second pump and is at an outside side connected with a hot water delivery pipe for delivering hot water from the reservoir, the outlet comprising an electrically-operated outlet valve, an electrically operated delivery device being incorporated into the hot water delivery pipe, the regulating device being connected with the electrically-operated outlet valve, with the delivery device and with the second pump for operation thereof, and whereby the regulating device is connected with a user-operated selection unit for selecting the operation of the outlet valve or the delivery device in the hot water delivery pipe, and the regulating device is adapted to, when operation of the delivery device is selected by a user, close the valve and operate the second pump so that cold water is pumped to the heating reservoir via the water supply pipe and warm water is transported from the heating reservoir via the hot water delivery pipe.

9. The coffee-making machine in accordance with claim 8, wherein a second pump is connected with the heating reservoir water supply pipe.

10. The coffee-making machine in accordance with claim 9, wherein the second pump is incorporated in the pressure pump water supply pipe of the pressure pump, and the heating reservoir water supply pipe is connected to the reservoir via a branch pipe.

11. The coffee-making machine in accordance with claim 9, wherein a parallel supply pipe is connected on one hand with the second pump and on the other hand with the heating reservoir.

12. The coffee-making machine in accordance with claim 8, wherein incorporated in the pressure pump water supply pipe is the flow meter which is connected with the regulating device, the second pump is connected with the heating reservoir water supply pipe, and the regulating device operates on a basis of flow measured by the flow meter.

* * * * *

UNITED STATES PATENT AND TRADEMARK OFFICE
CERTIFICATE OF CORRECTION

PATENT NO. : 8,375,845 B2 Page 1 of 1
APPLICATION NO. : 12/090948
DATED : February 19, 2013
INVENTOR(S) : Johannes Theodorus Emerentia Huiberts It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 990 days.

Signed and Sealed this
First Day of September, 2015

Michelle K. Lee
*Director of the United States Patent and Trademark Office*